May 28, 1968 R. P. PATTON 3,385,545
CONDUIT HANGING APPARATUS
Filed Feb. 9, 1966

INVENTOR.
ROBERT P. PATTON
BY *Hamilton & Cook*
ATTORNEYS

United States Patent Office 3,385,545
Patented May 28, 1968

3,385,545
CONDUIT HANGING APPARATUS
Robert P. Patton, 2649 Woodward Road,
Cuyahoga Falls, Ohio 44221
Filed Feb. 9, 1966, Ser. No. 526,308
1 Claim. (Cl. 248—68)

ABSTRACT OF THE DISCLOSURE

A hanging apparatus for supporting a pair of suspended conduits in predetermined relation to a self-supported conduit consisting of a ring clamp with flanges spaced and joined by a fastener for selective securement along the self-supported conduit, a pair of ears on the ring clamp each having a pair of projections extending outwardly and joined at the extremities by a facing plate, and yokes selectively rotatably aligned with and attached to each of the ears and having arcuate offsets for engaging the suspended conduits, shanks extending from one extremity of the arcuate offsets and joined by a base, offset flanges at the other extremity of each of the arcuate offsets and spaced and joined by a fastener, and the facing plates of the ears and the bases of the yokes being joined by fasteners.

---

The present invention relates generally to conduit hanging apparatus. More particularly, the invention relates to a hanger for supporting and retaining a suspended conduit in predetermined relation to a fixed member. Specifically, the invention relates to a hanger for spacing and supporting a suspended conduit or pipe in predetermined relation to a fixed conduit or pipe.

In recent years, there has been a vast increase in the use of lines and conduits for the transmission of electricity, water, gas and oil, in both industrial and domestic applications. Originally, components for holding or suspending these members within the framework of a building were custom made on the building site from any available scrap or inexpensive material. More recently, increased labor costs have prompted the prefabrication of many parts and components which were formerly built on the job. This trend to prefabrication has extended, to a degree, into the field of conduit hangers where at least some of the general purpose components are available in ready-made form of wood, lath, wire, angle iron, or U-bolt construction.

Under this more modern practice, suitable hangers are constructed from a selection of different size parts or from universal components adapted for a particular installation by forming or adding parts at the job site. Since an appreciable amount of time is still required to prepare and install these hangers, the cost remains high. A particularly troublesome area which is extremely repetitive lies in the installation of service lines for sinks or other plumbing fixtures. Characteristically these installations have a vent or waste pipe which is self-supporting and one or more associated pipes which provide a supply of water. The water pipes normally substantially parallel the vent pipe and are most conveniently supported thereby. Since the spacing between these members is usually constant at the outlet of the plumbing fixture, this relationship is conveniently maintained in the pipe chases and may be continued throughout the run of the pipes in a building.

Accordingly, a principal object of the present invention is to provide a hanger which will space, support, and align conduits in predetermined relation to a fixed conduit to reduce the vibration and attendant noise caused by fluid surge and hammer.

Another object of the invention is to provide a hanger which can be attached to a self-supporting conduit and support a pair of suspended conduits at a fixed distance therefrom and with the centerline of the conduits in coplaner alignment.

An additional object of the invention is to provide a hanger which will support a suspended conduit at any orientation in a plane substantially perpendicular to a support erected perpendicular to an associated fixed or self-supporting conduit without elaborate trapeze hanging employing clamps, bolts, or other accessories.

A further object of the invention is to provide a hanger having suitable means for supporting either one or two suspended conduits in proximity thereto.

Still another object of the invention is to provide a prefabricated hanger adapted to be fitted and attached to standard conduits or pipes on a job site with a minimum of labor and no special tools or equipment.

Other objects are to provide a hanger for conduits or pipe which is inexpensive to manufacture, durable, and easy to assemble.

Various other objects and advantages will appear from the following description taken in conjunction with the attached drawings, and the novel features will be particularly pointed out hereinafter in conjunction with the appended claims.

Figure 1:
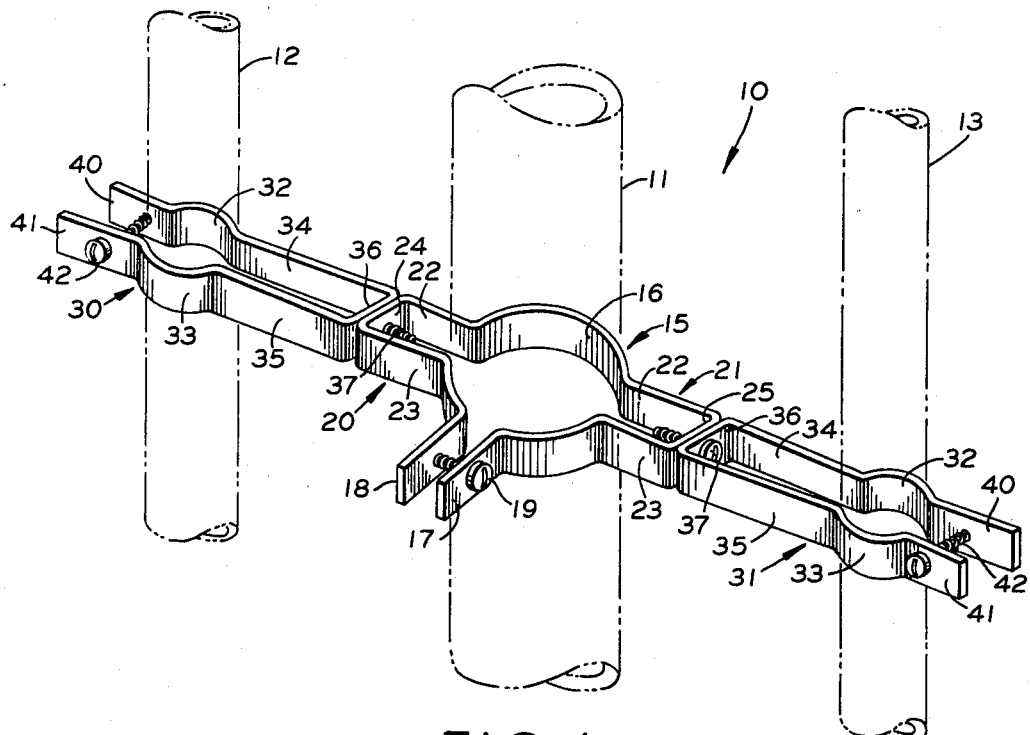
FIG. 1 is a perspective view of a conduit hanger assembly according to the present invention in a typical configuration showing a center vent or waste pipe in phantom lines and parallel water pipes supported on either side thereof in phantom lines.

Referring now to the drawings and particularly to FIG. 1, conduit hanging apparatus according to the present invention is indicated generally by the numeral 10. For purposes of illustration and description, the conduit hanging apparatus is shown in conjunction with a typical set of service lines for a plumbing fixture. A vent or waste pipe 11, shown in phantom lines, is located centrally of flanking water pipes 12 and 13, also shown in phantom lines, of a slightly smaller diameter, and supplying hot and cold water.

The conduit hanging apparatus 10 is attached to and supported by the vent or waste pipe 11, or other similar self-supported member, by a clamping device, generally indicated by the numeral 15. As shown, the clamping device 15 is a generally cylindrical ring clamp 16 having substantially radially outwardly projecting attachment flanges 17 and 18. The ring clamp 16 is shaped to substantially conform to the exterior dimension of a standard vent or waste pipe and may be applied or installed at any location along its length by constructing the ring clamp 16 of suitable spring material (as shown) or employing a hinge of the various types well known to the art at a position displaced about the circumference from the attachment flanges 17, 18. After the ring clamp 16 is applied or installed at the desired position longitudinally of the vent or waste pipe, it is secured in place by a fastener 19 which is preferably a self-tapping machine screw or stove bolt and which extends through and spaces the attachment flanges 17, 18.

Figure 2:
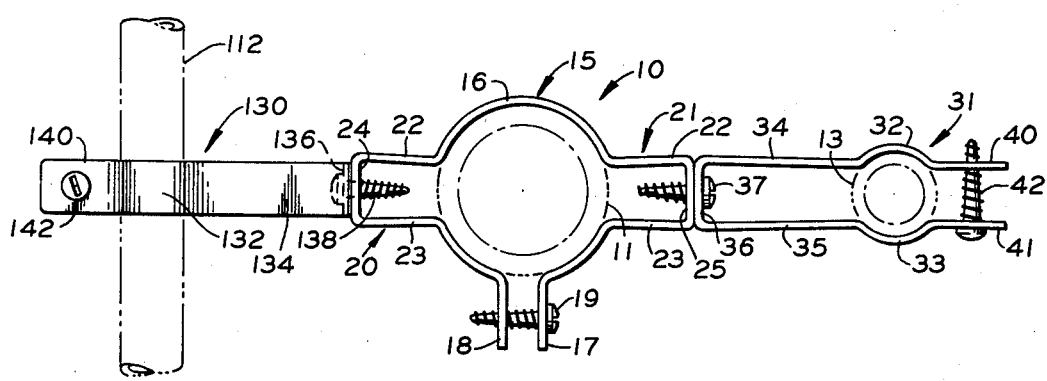
FIG. 2 is a top view of a conduit hanger according to the invention in a slightly different environment, wherein the left hand portion of the hanger supports a conduit or pipe shown in phantom lines which is disposed in angular orientation to the center vent or waste pipe.

Referring now to FIG. 1 and the right hand portion of FIG. 2, the ring clamp 16 has opposed projections or ears, generally indicated by the numerals 20 and 21, which are preferably spaced circumferentially about ring clamp 16 from attachment flanges 17, 18 in non-interfering relation thereto. For ease and economy of manufacture, the ears 20, 21 may be formed integrally with the ring clamp 16 as circumferential interruptions. Each of the ears 20, 21 has a pair of spaced projections 22 and 23 which extend generally radially outwardly of the vent pipe 11. At their outward extremities, the projections 22 and 23 are spaced and joined by attachment or facing plates 24 and 25 for the ears 20, 21, respectively. In installations where two water pipes 12, 13 are to be supported, the ears 20, 21 are advantageously positioned substantially diametrically opposite on the vent pipe 11, thereby establishing an alignment whereby the center lines of the vent pipe 11 and the water pipes 12, 13 may be coplanar.

The clamping device 15 when secured to vent pipe 11 is spaced from and joined to the associated water pipes 12, 13 by brackets or yokes, generally indicated by the numerals 30 and 31. As shown, each of the yokes 30, 31 is of a generally U-shaped strip material having lateral arcuate offsets 32 and 33 which conform to a portion of the outer periphery of the water pipes 12, 13. Projecting inwardly from the offsets 32, 33 and spacing the pipes 12, 13 from the ears 20, 21, respectively, the yokes 30, 31 each have shanks 34 and 35 which are joined by a base 36. The bases 36 are preferably flat, or otherwise conveniently geometrically shaped, to seat against the facing plates 24, 25 of ears 20, 21 and be selectively rotationally secured by fasteners 37, while maintaining the axes of yokes 30, 31 substantially in a uniform longitudinal orientation.

Projecting outwardly from the arcuate offsets 32, 33 in the direction opposite the shanks 34, 35 the yokes 30, 31 each have offset flanges 40, 41. The flanges bored to receive fasteners 42, such as self-tapping machine screws or stove bolts, may be identical to the fasteners 19 and 37 for the convenience of interchangeability. In the most common installations, where the vent pipe 11 and the water pipes 12, 13 are parallel, the yokes 30, 31 may be seated and secured by the fasteners 37 prior to guiding the water pipes into the arcuate offsets 32, 33 and inserting the fasteners 42. Alternatively, where the water pipes 12, 13 have previously been roughed into position, the pipes normally have sufficient lateral freedom to allow displacement around and insertion between the offset flanges 40, 41. If necessary, the yokes 30, 31 may be rotationally adjusted after placement of the water pipes 12, 13 by the use of a ninety-degree screwdriver.

Referring now to the left hand portion of FIG. 2, a water pipe 112 is shown having a diameter slightly less than the diameter of the pipes 12, 13 and being positioned perpendicular to the vent pipe 11, rather than parallel thereto. A yoke 130 similar to the yokes 30, 31 spaces and joins the clamping device 15 and the water pipe 112. The yoke 130 is constructed with arcuate offsets 132, shanks 134, offset flanges 140, a base 136, and fasteners 138 and 142, all similar to the corresponding components of the previously described yokes 30, 31.

Since the distance between the centerlines of the vent pipe and the associated water pipes is normally a constant, commonly four inches, for any water pipe size, the arcuate offsets are curved to conform to the exterior dimension of a particular pipe, while the length of the shanks is varied to maintain a constant lineal dimension between the centerline of the water pipe and the base of the yoke. In the modification in FIG. 2 employing the reduced diameter water pipe 112, the arcuate offsets 132 are of reduced curvature and lineal length with longer shanks 134 for appropriate compensation. Water pipes are readily available in standard size intervals from three-eighths inch to three inches, and a small selection of yokes provides precise positioning for any size water pipe employed in a particular installation.

In a similar manner, the distance between the centerline of vent pipe 11 and the facing plates 24, 25 of ring clamp 16 is maintained constant for all sizes of vent pipe. Thus, as the diameter of the ring clamp 16 is increased to encompass larger pipe diameters, the length of the projections 22, 23 is appropriately decreased.

Although the water pipes in an installation normally parallel the vent pipe, one or more intersecting runs perpendicular to the vent pipe, as shown in the left portion of FIG. 2, or at any random angles may be supported. Such angular intersections may also occur in the area near a plumbing fixture or at a T-joint marking the departure of an auxiliary or branch line.

The concepts of the present invention are clearly applicable to cases where only a single water pipe is supported. In such cases, one of the ears 20, 21 is left without a yoke or bracket 30, 31 attached thereto. Alternatively, the ring clamp 16 could be constructed with only one of the ears 20, 21. Depending upon the construction of the vent and water pipes, the hanger 10 may be formed from a variety of materials including steel, electro-coppered steel, plastic or other materials having comparable characteristics. In a typical installation where the vent pipe is steel and the water pipes copper, the ring clamp 16 might be of steel construction, while the yokes 30, 31 could be electro-coppered steel to prevent electrolytic action.

A preferred form of the invention has been shown and described in sufficient detail to enable one skilled in the art to practice the invention. Since various modifications in details, materials and arrangements of parts are within the spirit of the invention herein disclosed and described, the scope of the invention should be limited solely by the scope of the attached claim.

What is claimed is:

1. A hanging apparatus for supporting, spacing and aligning a pair of suspended conduits in predetermined relation to a self-supported conduit comprising, a ring clamp with flanges spaced and joined by a fastener for selective securement longitudinally of said self-supported conduit, a pair of ear means on said clamping device located diametrically opposite on said self-supported conduit when said clamping device is secured thereto and having a pair of projections extending outwardly and joined at the extremities thereof by a facing plate, and yoke means selectively rotatably aligned with and attached to each of said ear means and each having a pair of arcuate offsets for conformance with the outer periphery of said suspended conduits, shanks extending from one extremity of each of said arcuate offsets and joined by a base, offset flanges at the other extremity of each of said arcuate offsets and selectively spaced and joined by a fastener, and said facing plates of said ears and said bases of said yokes being joined by fasteners.

References Cited

UNITED STATES PATENTS

| | | | |
|---|---|---|---|
| 2,174,459 | 9/1939 | Borsetti | 287—49 XR |
| 2,375,513 | 5/1945 | Bach | 248—59 |
| 2,392,932 | 1/1946 | Macbeth | 248—230 XR |
| 2,858,266 | 10/1958 | Schneider | 211—182 XR |

ROY D. FRAZIER, *Primary Examiner.*

J. F. FOSS, *Assistant Examiner.*